(12) United States Patent
Wong

(10) Patent No.: US 7,058,623 B2
(45) Date of Patent: Jun. 6, 2006

(54) COMPUTER AUTOMATED SYSTEM FOR MANAGEMENT OF ENGINEERING DRAWINGS

(75) Inventor: Tin Cheung Wong, Hong Kong (HK)

(73) Assignee: VHSoft Technologies Company Limited, Kowloon (HK)

(*) Notice: Subject to any disclaimer, the term of this patent is extended or adjusted under 35 U.S.C. 154(b) by 944 days.

(21) Appl. No.: 09/778,881

(22) Filed: Feb. 8, 2001

(65) Prior Publication Data

US 2001/0014887 A1 Aug. 16, 2001

(30) Foreign Application Priority Data

Feb. 15, 2000 (GB) ................................. 0003404.1

(51) Int. Cl.
*G06F 17/30* (2006.01)

(52) U.S. Cl. ............................ 707/3; 707/101; 715/502; 715/526; 382/312

(58) Field of Classification Search .................... 707/1, 707/2, 3, 4, 5, 104.1, 100, 101, 103
See application file for complete search history.

(56) References Cited

U.S. PATENT DOCUMENTS

| 5,202,933 | A | * | 4/1993 | Bloomberg .................. 382/176 |
| 5,493,679 | A | * | 2/1996 | Virgil et al. ............. 707/104.1 |
| 5,845,288 | A | * | 12/1998 | Syeda-Mahmood .......... 707/102 |
| 5,895,473 | A | * | 4/1999 | Williard et al. ............. 715/502 |
| 5,923,782 | A | * | 7/1999 | Chhabra et al. ............ 382/202 |
| 6,014,450 | A | * | 1/2000 | Heilper et al. .............. 382/101 |
| 6,321,232 | B1 | * | 11/2001 | Syeda-Mahmood ...... 707/104.1 |

* cited by examiner

*Primary Examiner*—Mohammad Ali
*Assistant Examiner*—Isaac M. Woo
(74) *Attorney, Agent, or Firm*—Clark & Brody

(57) ABSTRACT

A computer automated method for identification, management and retrieval of engineering drawings in digital format where the central processing unit locates and identifies specific predefined textual and graphical information, relating to that drawing, in accordance with predefined algorithms. The textual information thus identified is then stored in accordance with predefined criteria to allow the engineering drawing to be identified and retrieved by reference to that textual information.

8 Claims, 6 Drawing Sheets contract

HOMANTIN SOUTH PHASE 1 drawing title

COMBINED SERVICES DRAWING OF SPECIAL BLOCK LEVEL 3
( SHEET 3 OF 6 )

| drawing no. | scale |
|---|---|
| HMT/CSD/SB/L3-3 | 1:50 |
| | rev. |

| drawn by | CAD |
|---|---|
| checked by | C.M.A. CHAN |

Main Contractor

YAU LEE CONSTRUCTION CO., LTD.
(A MEMBER OF YAU LEE HOLDINGS LIMITED)

HOUSING DEPARTMENT

FIGURE 5

Drawing Title

```
drawing title
    COMBINED SERVICES
      DRAWING OF
  SPECIAL BLOCK LEVEL 3
     ( SHEET 3 OF 6 )
```

Drawing No.

```
drawing no.
      HMT/CSD/SB/L3-3
```

Version

```
rev.
```

Drawn By

| drawn by | CAD |

Check By

| checked by | C.M.A. CHAN |

FIGURE 6

COMPUTER AUTOMATED SYSTEM FOR MANAGEMENT OF ENGINEERING DRAWINGS

This invention relates to a method in a computer automated data processing system for automatically identifying engineering drawings in digital format, in accordance with predefined algorithms, to enable the compilation of a database of the said engineering drawings which allows a user to immediately locate and retrieve the engineering drawings from the said database in accordance with defined parameters such as date of creation, date of revision, drawing number.

In the development of any construction project there are generally hundreds, if not thousands, of engineering drawings, covering every aspect of the construction. These drawings are modified from time to time during the course of the development. The modifications, regardless of whether they are minor, or major, require a further drawing to be created, thus adding to the already large number of drawings.

The proper and efficient management of such drawings in any project is absolutely vital to enable the project to be completed efficiently and on-time. Thus it can be seen from this that proper drawing management is a vital tool in the construction industry.

The conventional method of managing such engineering drawings has been to do so manually or by inputting keywords necessary to identify a particular drawing into a computerized database. Both of these methods are extremely time-consuming, very inefficient, costly and subject to a large degree of error. A further disadvantage of the conventional drawing management systems is that if the engineering drawings are not properly catalogued the engineers may not realize that a drawing has been modified and may not be able to locate it at all.

The present invention seeks to eliminate the disadvantages of the conventional method of indexing and storing drawings.

It is an aim of the present invention to provide a more efficient, cost-effective and fast method of managing engineering drawings in digital format, such as drawings created using a computer aided design software or paper drawings which have been scanned using a scanner into a digital format, whereby such drawings can automatically be identified, indexed and stored for easy and fast retrieval without the need for each individual drawing to be entered manually into the database.

The present invention relates to a method in a computer automated data processing system where the central processing unit of a computer analyses engineering drawings, in digital format, such as drawings created using a computer aided design software or paper drawings which have been scanned using a scanner into a digital format, using a set of predefined algorithms, to identify specified information contained in the drawings. This information is then collated in a database to enable the user to search for and retrieve drawings by reference to specified criteria, such as "Drawing number", "Draftsman's name", "Project name" etc. The process is fully automatic and requires minimal input from the user.

Engineering drawings in general consists of two parts. One part has the actual engineering drawing itself, while the other part consists of a drawing frame. The drawing frame contains all necessary information relating to that drawing. While the actual engineering drawing itself may be complicated the format of the drawing frame tends to be standard regardless of the type of drawing.

In general terms the process by which the engineering drawings are analysed is carried out as follows. The data which is in digital format is analysed by the central processing unit through a series of predefined algorithms to initially identify each engineering drawing. Once the drawings have been identified the information in the text boxes in each of the drawing frames is processed by the central processing unit of the computer, in accordance with a series of predefined algorithms, to identify and classify the information in the text boxes. This information can then be collated in a database in accordance with specified criteria and their classification to enable the user to locate and retrieve any particular drawing. Thus for example information about the class drawing number, or class version, the class drawing title, or general information such as construction element names, together with the file names, can be identified and collated. The user can then retrieve drawings by reference to these parameters.

In addition to this the central processing unit also identifies any text located within each engineering drawing itself. This text is also stored in a database so that the text is associated with that engineering drawing and enables a user to locate an engineering drawing by reference to that text.

The boundary of each engineering drawing is firstly identified. Within this boundary the central processing unit then endeavours to locate a series of text boxes which are in an orderly arrangement to locate and identify the drawing frame. The contents of each text box within the drawing frame are then analysed to identify keywords belonging to certain predefined class such as "Drawing title", "Drawing number" etc. If keywords are located in the box the contents of the box are further analysed to see if the box contains two different types of content such as title of box and description of contents. Once such a box is located and it is determined that this is a relevant drawing box the contents of the said box are then classified and stored in the structured database to allow the drawing to be retrieved.

Data from the engineering drawings is analysed by comparing the values from the engineering drawing with known predetermined values stored in a database. If the value in the engineering drawing is the same as or similar to the predetermined value stored in the database further analysis of the data can then be carried out, or the information can be identified as the required information and stored in the database.

The identification of the engineering drawing and the relevant text boxes within that drawing are key steps of the system which enable the management of engineering drawings. The best method of carrying out the process will now be described below.

Initially all graphic data from the drawing files is collected. Such graphic elements are then put into different categories according to their characteristics such as lines, text, symbols, broken lines and are then stored in different arrays. The central processing unit then analyses the graphic element data to identify the engineering drawings and ascertain the exact number and orientation of the drawing frames as follows:

1. The central processing unit identifies any horizontal two point straight line from the line array or the multiple line array with the length longer than a predetermined figure.
2. The central processing unit then searches for all lines that connect the end points of this horizontal two point straight line to establish whether these connecting lines form a closed rectangular region.

3. Once all the horizontal two point straight lines which form a closed rectangular region have been identified they are grouped together, which for the sake of convenience can be identified as set A.
4. In respect of every closed rectangular region in set A the central processing unit then analyses whether the closed rectangular region is itself contained by a bigger rectangular closed region. If any closed rectangular region is contained by a larger closed rectangular region the smaller closed rectangular region it is deleted from set A.
5. This step is repeated in respect of all the closed rectangular regions and as a result only those regions that are not contained by another closed rectangular region are left in set A. Thus the closed rectangular regions should now represent the boundary of potential engineering drawings.
6. Each closed rectangular region from the previous step is then analysed by the central processing unit to establish whether there is any text and/or lines within the rectangular region. If no text and line elements are contained within the rectangular region it is determined that the rectangular region does not contain any engineering drawings and is deleted from set A.
7. Each closed rectangular region in set A is then further analyzed to establish whether it is divided by a horizontal or vertical line creating two adjacent rectangular regions which for the sake of convenience can be labeled as (a) and (b). The two regions (a) and (b) represent the drawing content and drawing frame. The rectangular regions labeled (a) and (b) must share a common border. If no closed rectangular region labeled (b) i.e. no drawing frame is attached to the closed rectangular box in set A this is then excluded from further analysis.
8. The rectangular regions in set A are then further analyzed to establish whether each region labeled (a) and (b) contains any text. If no text is found the closed rectangular region is then excluded from set A.
9. The closed rectangular regions thus identified by the central processing unit represent engineering drawings which contain drawing content and the drawing frame.

Through this process each engineering drawing contained within a closed rectangular region and which contains two distinct regions which contain the drawing frame and the drawing content can be identified.

Once the drawing frame has been identified the central processing unit then analyses all closed regions within the drawing frames i.e. the text boxes, to identify the textual content of each text box. This textual information is then collated in a database to enable the drawing to be identified and retrieved by reference to the textual information.

The central processing unit analyses the content of each text box in the drawing frame individually to ascertain the existence of predefined classes according to the keywords such as "Drawing Number" "Drawing Title" "Version" etc. The said keyword are further analysed by reference to their position within the text box. The algorithm to determine and identify keywords is predefined and stored as instruction codes to be executed by the central processing unit.

If the keywords are located within the text box and the position of the keywords is such that it assumes a keyword position in the text box then the central processing unit analyses the text box further to ascertain whether there is any further textual content within that text box. If there is any further text in the text box this information is then stored in a structured database such that the information is associated with that particular drawing and class and the drawing can be retrieved by reference to that information.

Further any text in the actual drawing content section of the engineering drawing is also identified by the central processing unit. This text is also stored in a database so that the text is associated with that engineering drawing and enables a user to locate an engineering drawing by reference to that text.

An essential feature of the process is that once the process has been started it is totally automatic in that all drawings which are required to be identified are automatically analysed without any further input from the user.

The process will now be described by reference to the drawings.

FIG. 5 shows the individual text boxes within the drawing frame which are to be analysed and interpreted.

FIG. 6 shows the individual text boxes which are used to develop the database.

Figure 1:
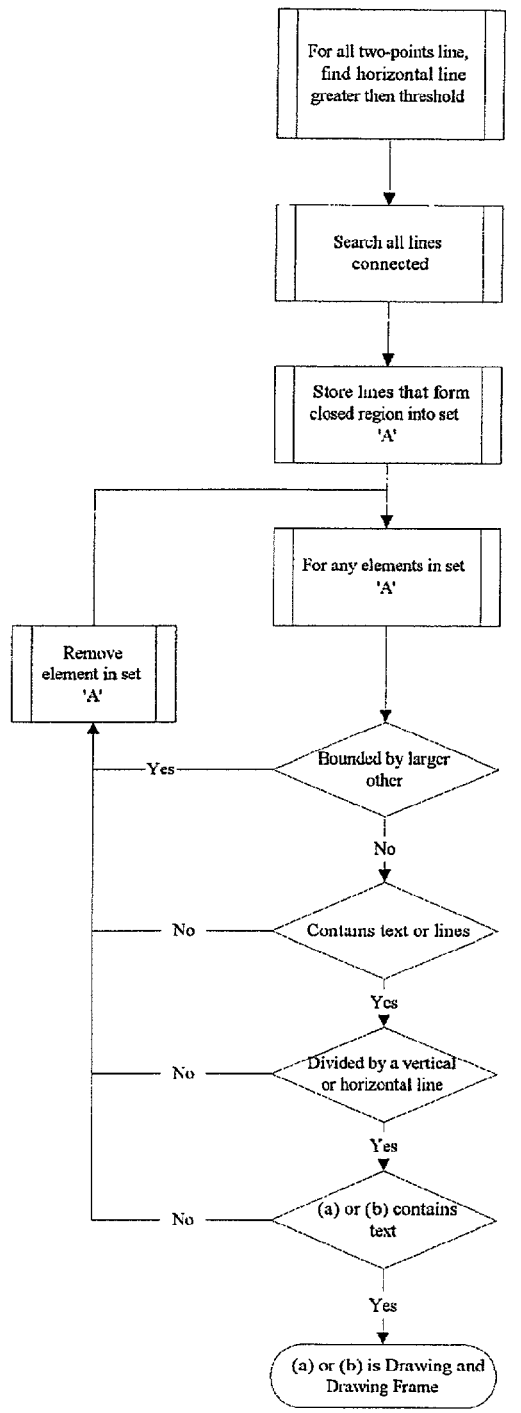
FIG. 1 shows a flowchart of the process of identifying the engineering drawings and the drawing frame.

FIG. 1 graphically illustrates the process referred to in points 1 to 9 hereinabove to identify the individual engineering drawing and drawing frame.

Figure 2:
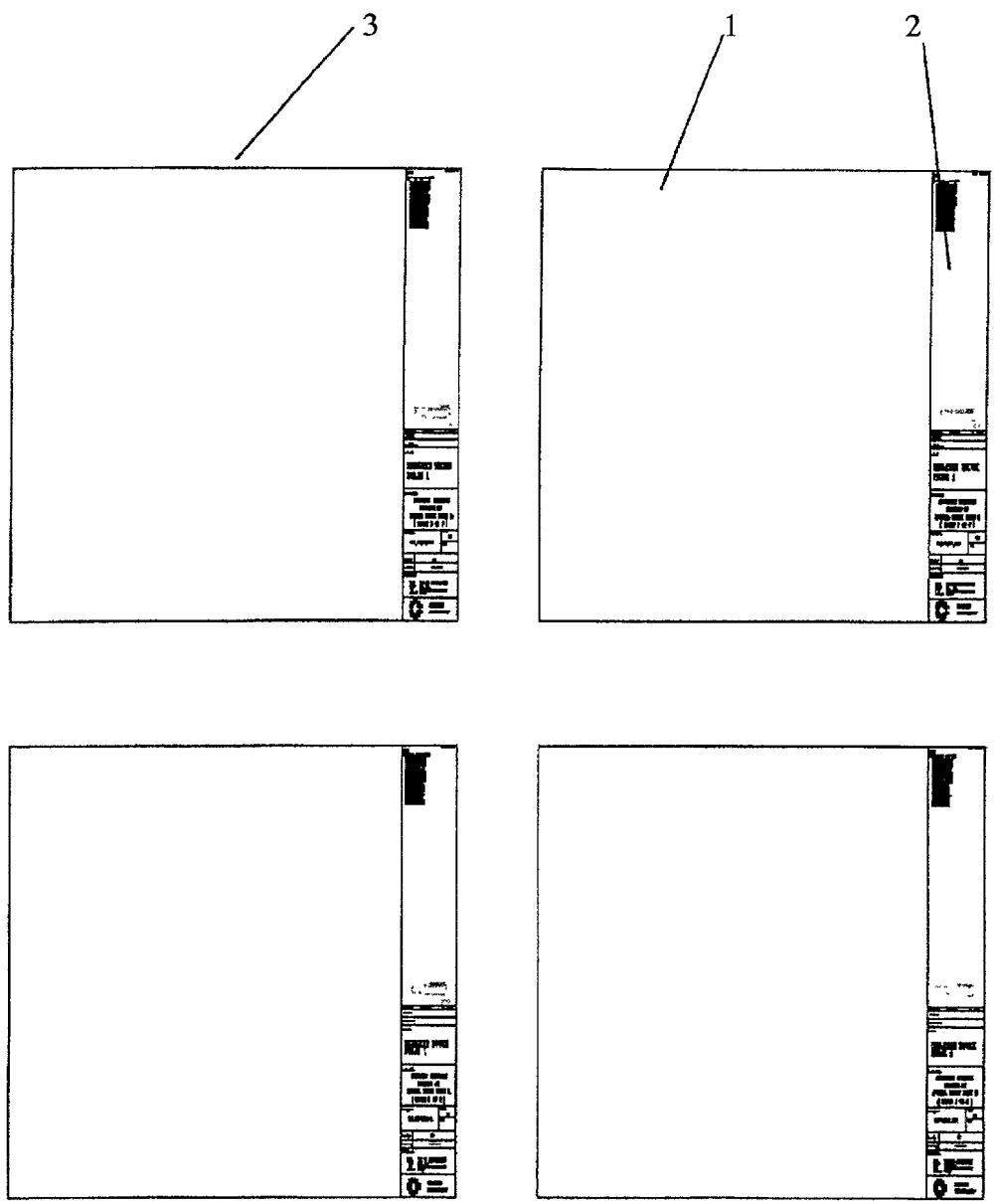
FIG. 2 shows a typical engineering drawing containing the drawing content frame and the drawing frame.

FIG. 2 shows a typical engineering drawing with the drawing content (1) and drawing frame (2) each contained in a distinct rectangular region. The rectangular region (3) containing the drawing is not enclosed by any other rectangular region. The actual engineering drawing is contained in the drawing content region (1) while the drawing frame (2) contains information about the engineering drawing.

Figure 3:
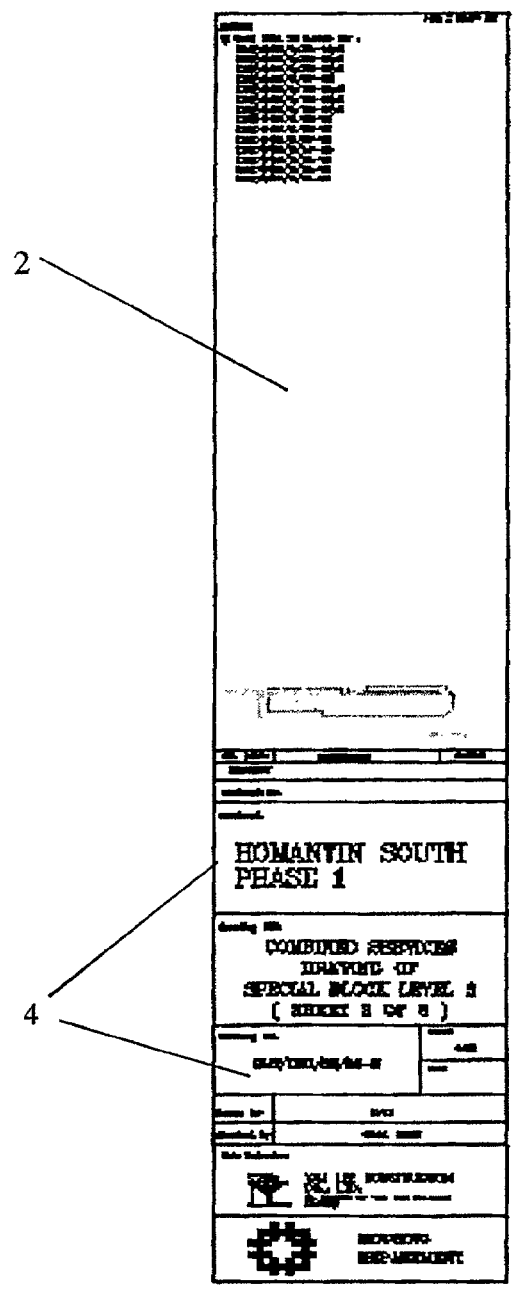
FIG. 3 shows a typical drawing frame.

FIG. 3 shows a typical drawing frame (2) which contains a variety of information about the engineering drawing in distinct text boxes (4) which are arranged in an orderly manner. Each text box within the drawing frame contains a distinct piece of information about the engineering drawing. The drawing frame shown in FIG. 2 has a horizontal orientation, but it can in fact have a vertical orientation.

Figure 4:
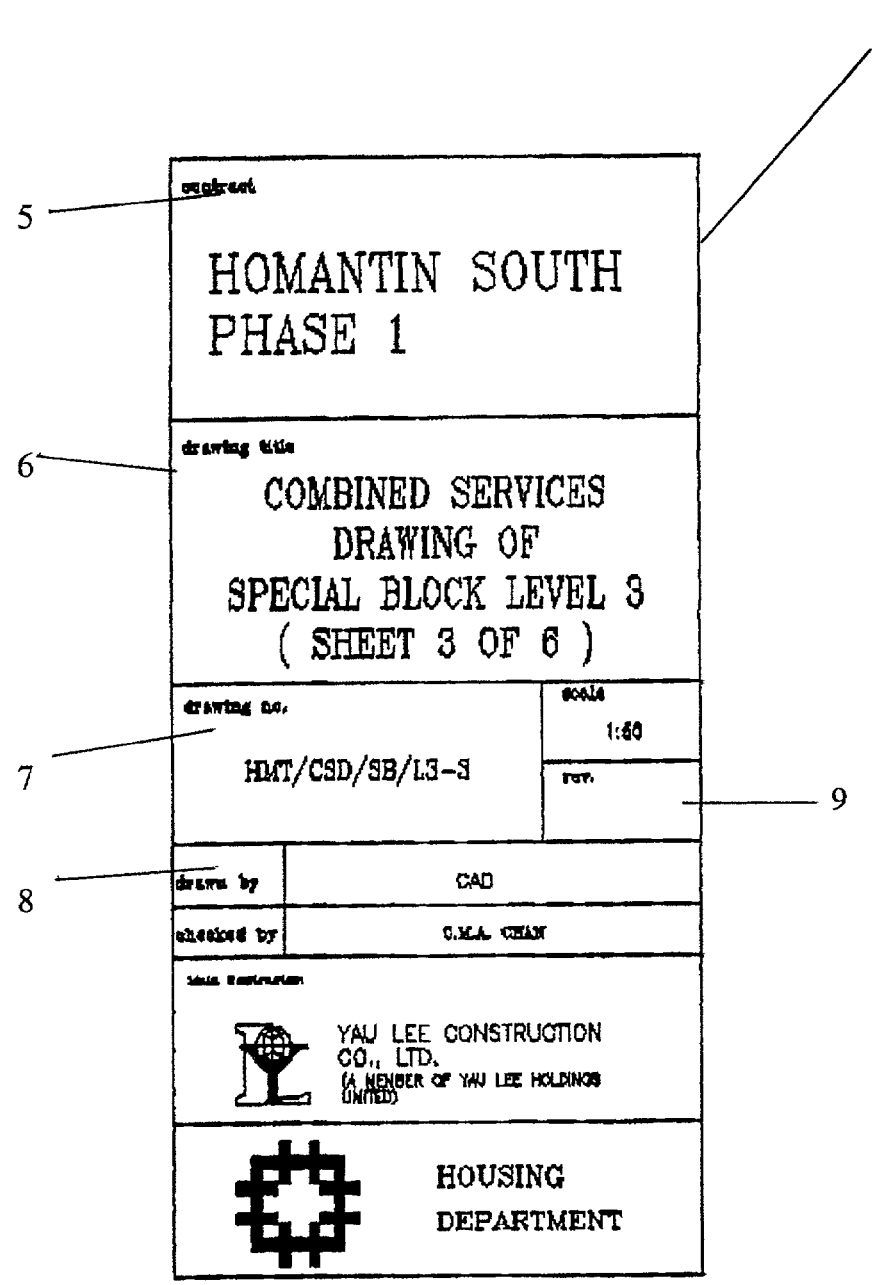
FIG. 4 shows a detailed version of the drawing frame which is to be analysed.

FIG. 4 shows a detailed version of the drawing frame containing several distinct text boxes (4). Each text box contains a distinct piece of information such as Contract Name(5), Drawing Title (6), Drawing Number (7), Drawn By (8), Revision (9).

FIG. 5 shows the individual text boxes within the drawing frame which are analysed individually and the contents of which are compiled in a database from which the drawing can be identified and extracted.

FIG. 6 shows the information which can be extracted from the drawing frame and which information is then compiled in a database.

The drawings, which are in digital format, have to firstly be identified as individual drawings. The purpose of this is so as to identify which information relates to which drawing. This is carried out by the central processing unit analysing the graphic elements to find closed rectangular regions (3) which are not contained by another closed rectangular region. This process identifies the boundary of each potential engineering drawing. The central processing unit then analyses the content of each such closed rectangular region to ascertain whether such closed rectangular region has any text and lines within it. Those rectangular regions with no text and/or lines are not analysed further as they do not contain engineering drawings.

Those closed rectangular regions with text and/or lines are then further analysed to ascertain whether they are divided by a horizontal or vertical line so as to create two adjacent closed rectangular regions. These two adjacent rectangular regions are the drawing content region (1) and the drawing frame region (2). The drawing frame (2) is identified by a series of distinct rectangular boxes (4) which contain information about the engineering drawing. Each distinct rectangular box is analysed to identify the text contained in the box. If the text identified by this process is the same as or similar to predefined values stored in a database then the information from the text box is collated in a database in accordance with predefined parameters and can be used to identify a particular drawing.

Accordingly a database can be compiled by reference those classes with keywords used in identifying relevant text boxes such as "Contract Name" (5), "Drawing Title" (6), "Drawing Number" (7), "Drawn By" (8) and "Revision" (9). A search of the database by reference to such classes will result in identifying all drawings which have that information in the text boxes in the drawing frame.

Further any text contained within the actual drawing content (1) is also identified by the central processing unit. This text is also stored in a database so that the text is associated with that particular engineering drawing and a user can then locate that particular engineering drawing by searching the database by reference to that text.

The invention claimed is:

1. A computer automated process for identification, management and retrieval of engineering drawings in digital format comprising the steps of:
   (i) analyzing graphical and textual digital data in a drawing using a central processing unit to identify individual engineering drawings, to identify a series of discrete boxes within each engineering drawing containing predefined keywords and to further identify any text contained within the drawing and within said discrete boxes; and
   (ii) storing a textual content in the discrete boxes in a memory means in a relational database, the textual content of the discrete boxes is stored by reference to the predefined keywords of each discrete box and wherein the individual engineering drawings are identified and retrieved by reference to the predefined keywords and the textual contents of the discrete boxes and the text contained within the individual engineering drawing;
   wherein all the graphical digital data is analyzed by the central processing unit to identify any horizontal two point straight line array or multiple line array longer than a predetermined figure;
   wherein the central processing unit then identifies all lines connecting two points of the horizontal two point straight line to establish a closed rectangular region; and
   wherein any closed rectangular region not bounded by a larger closed rectangular region is identified as the boundary of each individual engineering drawing.

2. The process as claimed in claim 1, wherein:
the graphical and textual digital data within the engineering drawing is analyzed by the central processing unit to identify two vertically or horizontally adjacent rectangular regions with a shared border and wherein one such rectangular box contains a series of discrete boxes in an orderly arrangement containing textual content.

3. The process as claimed in claim 2, wherein:
the central processing unit identifies predefined keywords within the discrete boxes and wherein the textual information contained within each said discrete box is identified and stored in a storage means whereby the engineering drawing is identified by reference to one or both of the keywords and the textual information.

4. The process as claimed in claim 3, wherein:
the engineering drawings stored in the storage means are located, retrieved and displayed on a suitable display means by reference to the exact textual information sought and wherein the textual information may be readily identified by suitable highlighting means.

5. The process as claimed in claim 2, wherein:
the textual information contained within each engineering drawing is stored in the storage means to enable the engineering drawing to be identified by reference to the textual information.

6. The process as claimed in claim 5, wherein:
the engineering drawings stored in the storage means are located, retrieved and displayed on a suitable display means by reference to the exact textual information sought and wherein the textual information may be readily identified by suitable highlighting means.

7. The process as claimed in claim 2, wherein:
the engineering drawings stored in the storage means are located, retrieved and displayed on a suitable display means by reference to the exact textual information sought and wherein the textual information may be readily identified by suitable highlighting means.

8. The process as claimed in claim 1, wherein:
the engineering drawings stored in the storage means are located, retrieved and displayed on a suitable display means by reference to the exact textual information sought and wherein the textual information is readily.

* * * * *